W. E. GUYOT.

BUCKLE.

APPLICATION FILED JAN. 3, 1921.

Reissued July 5, 1921. 15,138.

Inventor

Walter E. Guyot

By Howard E. Barlow

Attorney

UNITED STATES PATENT OFFICE.

WALTER EUGENE GUYOT, OF ATTLEBORO, MASSACHUSETTS.

BUCKLE.

15,138. Specification of Reissued Letters Patent. Reissued July 5, 1921.

Original No. 1,360,937, dated November 30, 1920, Serial No. 385,279, filed May 29, 1920. Application for reissue filed January 3, 1921. Serial No. 434,735.

*To all whom it may concern:*

Be it known that I, WALTER EUGENE GUYOT, a citizen of the United States, residing at Attleboro, in the State of Massachusetts, have invented certain new and useful Improvements in Buckles, of which the following is a specification, reference being had therein to the accompanying drawing.

This invention relates to that class of buckles that have a pivoted part that by wedge or cam action clamps a strap or the like to hold it against tension, the arrangement being such that the engaging or retaining action may be at any desired place on a strap or the like.

It is an object of the invention so to form and organize the parts of such a buckle that the pull of both the adjustably-held and fixedly-held portions of a strap as the like act directly on the clamping member to cause it to hold.

A further object of the invention is to pivotally support a clamp member in the body of the buckle, the clamp being provided with two spaced-apart, rigid clamping edges located at different distances from the pivotal axis of said member, each edge being adapted to engage and clamp a belt independently of the other, the different clamping lengths of this edge rendering it capable of engaging belts of widely different thicknesses.

Another object of the invention is to arrange the parts in such manner that the clamping member easily may be pressed to and released from clamping position.

When read in connection with the description herein, the details and characteristics of the invention will be apparent from the accompanying drawing, forming part hereof, wherein an embodiment of the invention in a belt-buckle is disclosed, for purposes of illustration.

While the disclosures herein exemplify what now is considered to be a preferable embodiment of the invention, it is to be understood that it is not the intention to be limited necessarily thereto in interpretation of claims, as modifications and adaptations within the limits of the claims can be made without departing from the nature of the invention.

Like reference-characters refer to corresponding parts in the views of the drawing, of which—

Figure 1:
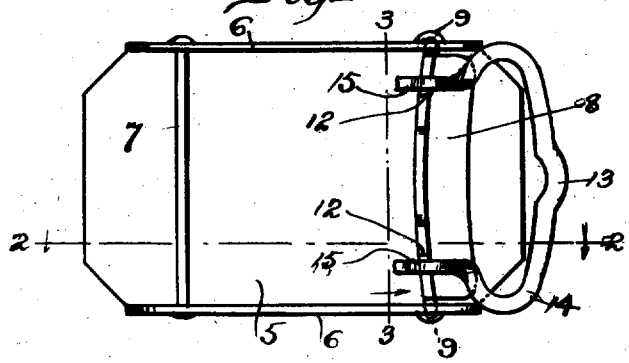
Figure 1 is a view of the rear side of the buckle.
Figure 2:
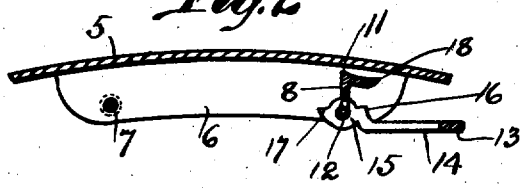
Fig. 2 is a longitudinal sectional view, on the line 2—2, Fig. 1.
Figure 3:
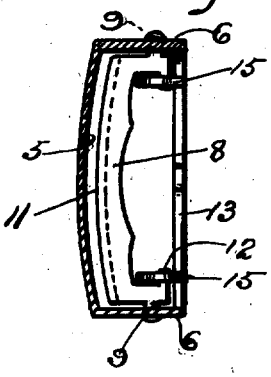
Fig. 3 is a view of the clamping member as seen when looking at an end of the buckle.

Having more particular reference to the drawing, 5 designates a front plate or body portion of the buckle. Oppositely-disposed flanges 6 extend at substantially right angles rearwardly from the front plate. With that plate they afford a guideway for the strap or the like to be adjustably held. Preferably the plate and flanges are formed integrally of sheet metal.

Near one end of the buckle, a guide-bar 7 may extend from one flange to the other in separated relation to the front plate and thus act as means to guide the movement of a strap or the like into the buckle and to hold it against the plate.

At or near the end of the buckle there is mounted a trunnion clamping member or tongue 8 which is carried by pintles 9 extending from the ends thereof into seats in the flange 6.

This clamping member is shown as being formed in substantially L-shape in cross section and is arranged to swing on its pivots, the lower edge 11 of the standard and the outer edge 18 of the base of the L providing two separate and distinct rigid clamping edges located at different distances from the pivotal center, whereby each edge is adapted to engage and clamp a belt independently of the other against the inner face of the buckle body.

Figure 5:
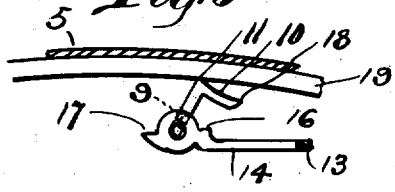
Fig. 5 is an enlarged view of the clamping member in position to clamp a comparatively thick belt by the edge having the shortest gripping radius.
Figure 4:
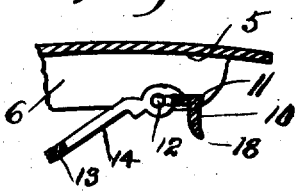
Fig. 4 is an enlarged sectional view of the clamping member.
Figure 6:
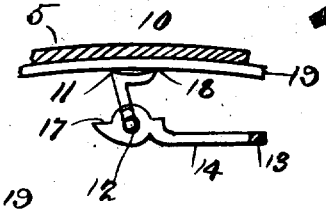
Fig. 6 is a similar view illustrating the clamp as engaging a belt of medium thickness by the combined action of both its long and short clamping edges.
Figure 7:
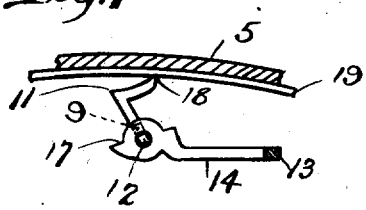
Fig. 7 is a detail illustrating the clamp as engaging a thinner belt by the clamping edge having the longest clamping radius.

In my present construction the clamp edge 18 is located at a greater distance from the swinging center than is the clamp edge 11, and therefore, when a comparatively thick belt is placed in the buckle the edge 11 will engage the belt and bind it against the inner face of the buckle body, as illustrated in Fig. 5. When the next thinner gage of belt is employed both the edges 11 and 18 may engage and bind a belt 19, as illustrated in Fig. 6, and when an extremely thin belt is employed the edge 18 will engage and bind a belt in the body of the buckle, as best illustrated in Fig. 7.

Substantially on the opposite side of the pivotal axis from the flange 10 the member 8 has oppositely-disposed pintles 12, which afford means of pivotally connecting to that member a bail or other suitable part arranged to act as a lever and to have an end portion of a strap or the like secured thereto. In the embodiment shown that part is made by stamping out from sheet-metal stock and bending to afford a cross-bar 13 arranged to have a portion of a strap or the like passed therearound and side portions 14 having enlarged terminal portions 15 formed with seats into which the pintles 12 extend.

On the side of the pivotal axis toward the cross-bar 13 each of the terminal portions 15 has a shoulder 16 positioned to engage the adjacent edge of the member 8 and to move the flange 10 of that member and its rib 11 or 14 against the strap or the like to be held adjustably in the buckle when the cross bar 13 is pressed toward the front plate of the buckle. When that flange and its rib have thus been brought into engagement its hold on the adjustably-held strap or the like, is increased both by the pull or stress thereof in one direction and by the pull or stress in the other direction of the part fixedly secured to the cross-bar 13, whereby a reliable hold is maintained on the adjustably-held part.

In order to facilitate release of the hold of the flange and its rib on the adjustably-held part, each terminal portion 15 has a lug 17 extending therefrom at a place substantially opposite to its shoulder 16. The lugs 17 are positioned to engage an adjacent portion of the member 8 when the cross-bar 13 is moved away from the front plate of the buckle and to move the flange and its rib in the releasing direction that is, in the direction opposite to movement into holding engagement with the adjustably-held part. With such an arrangement it is easy to loosen the adjustably-held part and to permit it to be moved under the clamping member, and it is not necessary in the opposite direction further to tighten it to release the hold of the flange and its rib thereon.

I claim:

1. A buckle comprising a body portion, a tongue thereon arranged to swing on one side of a pivotal axis into engagement with a part to be adjustably held, and a member swingably mounted on said tongue having a lug arranged to impart swinging movement thereto.

2. A buckle comprising a body portion, a tongue thereon arranged to swing on one side of a pivotal axis into engagement with a part to be adjustably held, and a member swingably mounted on said tongue having a shoulder arranged to impart swinging movement thereto.

3. A buckle comprising a body portion, a tongue thereon arranged to swing on one side of a pivotal axis into engagement with a part to be adjustably held, and a member swingably mounted on said tongue having a lug arranged to impart swinging movement thereto in one direction, and a shoulder arranged to impart swinging movement thereto in the opposite direction.

4. A buckle comprising a body portion, a tongue pivotally mounted thereon arranged to swing on one side of its pivotal axis into engagement with a part to be adjustably held and having pintles on an opposite side of said axis, and a member swingably mounted on said pintles having a lug arranged to impart swing movement to said tongue in one direction.

5. A buckle comprising a body portion, a tongue pivotally mounted thereon arranged to swing on one side of its pivotal axis into engagement with a part to be adjustably held and having pintles on an opposite side of said axis, and a member swingably mounted on said pintles having a shoulder arranged to impart swinging movement to said tongue in one direction.

6. A buckle comprising a body portion, a tongue pivotally mounted thereon arranged to swing on one side of its pivotal axis into engagement with a part to be adjustably held and having pintles on an opposite side of said axis, and a member swingably mounted on said pintles having a lug arranged to impart swinging movement to said tongue in one direction and a shoulder to impart swinging movement thereto in the opposite direction.

7. A buckle comprising a body portion, a tongue pivotally mounted thereon arranged to swing on one side of its pivotal axis into engagement with a part to be adjusably held and having pintles on an opposite side of said axis, a swingable loop member arranged to have a strap or the like fixedly secured thereto and having terminal portions into which said pintles extend, one of said terminal portions being arranged to engage an adjacent part of said tongue and to swing the latter in one direction, and a lug on one of said terminal portions arranged to swing said tongue in the opposite direction.

8. A buckle comprising a body portion, a clamp member pivotally supported in said body to engage and bind a belt in the body, and a bail member pivotally mounted on said clamp having its outer end free to be lifted from said body to pry said clamp from gripping position, and means also at the jointed end of the bail for limiting the gripping movement of said clamp.

9. A buckle comprising a body portion, a clamp member pivotally supported in said body to engage and bind a belt in the body, a bail member pivotally connected to said clamp and having its outer end free, and means at the joint end of the bail for limiting the gripping movement of said clamp by which means the bail may be employed for prying the clamp from its gripping position.

10. A buckle comprising a body portion, a clamp member pivotally supported in said body to engage and bind a belt in the body, a bail having a free outer end pivoted to said clamp, and means at the joint end of the bail permitting a restricted gripping and releasing movement of said clamp independent of the movement of said bail.

11. A buckle comprising a body portion, a clamp member pivotally supported in said body to engage and bind a belt therein, integral pintles formed on said member, and a bail member pivotally mounted on said pintles, and coöperating means at the pivot joint for limiting the gripping movement of said clamp, said bail having its outer end free to be lifted to pry the clamp from gripping position.

WALTER EUGENE GUYOT.